US009344249B2

(12) United States Patent
Dombrowski et al.

(10) Patent No.: US 9,344,249 B2
(45) Date of Patent: May 17, 2016

(54) METHOD FOR A TRANSMITTER FOR A MULTI-CHANNEL COMMUNICATION SYSTEM FOR SENDING REAL-TIME DATA

(75) Inventors: Christian Dombrowski, Herzogenrath (DE); James Gross, Stockholm (SE)

(73) Assignee: R3—RELIABLE REALTIME RADIO COMMUNICATIONS GMBH, Berlin (DE)

( * ) Notice: Subject to any disclaimer, the term of this patent is extended or adjusted under 35 U.S.C. 154(b) by 267 days.

(21) Appl. No.: 14/110,493

(22) PCT Filed: Apr. 5, 2012

(86) PCT No.: PCT/EP2012/056381
§ 371 (c)(1),
(2), (4) Date: Dec. 16, 2013

(87) PCT Pub. No.: WO2012/136827
PCT Pub. Date: Oct. 11, 2012

(65) Prior Publication Data
US 2015/0071184 A1    Mar. 12, 2015

(30) Foreign Application Priority Data

Apr. 8, 2011   (DE) .......................... 10 2011 001 911

(51) Int. Cl.
*H04L 5/00* (2006.01)
*H04L 1/08* (2006.01)
(Continued)

(52) U.S. Cl.
CPC ............ *H04L 5/0053* (2013.01); *H04L 1/0009* (2013.01); *H04L 1/04* (2013.01); *H04L 1/08* (2013.01); *H04B 1/74* (2013.01); *H04L 1/0625* (2013.01); *H04L 5/003* (2013.01)

(58) Field of Classification Search
CPC ........... H04L 1/08; H04L 1/0009; H04L 1/04; H04L 5/0053; H04L 1/0625; H04L 5/003; H04B 1/74
See application file for complete search history.

(56) References Cited

U.S. PATENT DOCUMENTS

2006/0008031 A1*  1/2006  Vummintala ........ H04B 7/0669
                                                        375/299
2007/0121567 A1*  5/2007  Venkatachalam ....... H04L 5/023
                                                        370/343

(Continued)

FOREIGN PATENT DOCUMENTS

| DE | 19850050 | 3/2000 |
| DE | 60219605 | 1/2008 |
| EP | 0854619 | 7/1998 |
| EP | 1371147 | 4/2007 |

OTHER PUBLICATIONS

Search Report for German Patent Application No. 102011001911.1, dated Nov. 3, 2011, 4 pages.

(Continued)

*Primary Examiner* — Jae Y Lee
(74) *Attorney, Agent, or Firm* — Sheridan Ross P.C.

(57) ABSTRACT

The invention discloses a method for sending real-time sensitive data using a transmitter for a multi channel communication system, wherein the communication system has n sub-channels, wherein n is greater than 1, wherein the sub-channels are spatially different and/or the sub-channels have different frequencies. The method has the steps of receiving information about the channel state of the n sub-channels, receiving information about the number of statistically independent sub-channels m, wherein m is less than or equal to n, and receiving data intended to be sent.

10 Claims, 2 Drawing Sheets

(51) Int. Cl.
*H04L 1/00* (2006.01)
*H04L 1/04* (2006.01)
*H04B 1/74* (2006.01)
*H04L 1/06* (2006.01)

(56) References Cited

U.S. PATENT DOCUMENTS

| | | | | |
|---|---|---|---|---|
| 2011/0199953 A1* | 8/2011 | Seok | ............... | H04W 4/06 |
| | | | | 370/312 |
| 2014/0204891 A1* | 7/2014 | Park | ............... | H04W 56/00 |
| | | | | 370/329 |

OTHER PUBLICATIONS

Mesquita et al. "Redundant data transmission in control/estimation over wireless networks," American Control Conference, 2009, Jun. 2009, pp. 3378-3383.

Willig "Antenna redundancy for increasing transmission reliability in wireless industrial lans," Emerging Technologies and Factory Automation, 2003, Proceedings, ETFA '03, IEEE Conference Sep. 16-19, 2003, pp. 7-14.

International Search Report prepared by the European Patent Office on Jul. 6, 2012, for International Application No. PCT/EP2012/056381.

\* cited by examiner

| a crc b crc |

| a b crc |

METHOD FOR A TRANSMITTER FOR A MULTI-CHANNEL COMMUNICATION SYSTEM FOR SENDING REAL-TIME DATA

CROSS REFERENCE TO RELATED APPLICATIONS

This application is a national stage application under 35 U.S.C. 371 and claims the benefit of PCT Application No. PCT/EP2012/056381 having an international filing date of Apr. 5, 2012, which designated the United States, which PCT application claimed the benefit of German Patent Application No. 102011001911.18 filed Apr. 8, 2011, the disclosures of which are incorporated herein by reference.

FIELD

The present invention relates to a method for a transmitter for a multi-channel communication system for sending real-time-sensitive data D.

BACKGROUND

Real-time-sensitive data transmission can be substantially described by two parameters. For one, the data must have been received completely by the recipient, and for another the data must have also been received within a predetermined time.

A distinction can be made here between so-called soft real-time communication and hard real-time communication.

Video data transmission and/or audio data transmission is understood, for example, as being soft real-time communication.

Unlike soft real-time communication, wired systems are generally relied upon for hard real-time communication, particularly if the demands for the probability of loss for data to be transmitted in a given time span are high, which is to say that the probability of loss is very low.

For instance, in the field of automobile automation, the requirements for the probability of loss for control data lie in the range of $10^{-6}$ to $10^{-10}$. Furthermore, transmission within a few milliseconds down to 100 microseconds is required in this range. It should be noted here that the actual payload size of the data to be sent tends to be rather small and is often only 100 bytes or fewer.

In order to meet these demands, communications systems that are based on optical data transmission have been used in order to fulfill the particularly high demands placed on the probability of loss in relation to the available time span.

This approach is disadvantageous, however, since wired transmission is inflexible and generally associated with high costs for reinstallation upon modification of system parts. Furthermore, it's been shown over and over that wired systems are damaged again and again during construction projects, resulting in downtime of the system.

Although the use of wireless systems has been proposed in isolated cases, no solution has yet been presented that resolves the most important problem of wireless systems, including with respect to the demands for real-time-sensitive data.

The most important problem here is that the wireless communication channel must be designed such that the stochastic characteristics of the wireless communication channel remain inconsequential.

In doing so, it must be considered that the quality of a wireless communication signal can vary greatly within a short period of time. This can for example be "promoted" by noise sources, but equally cancellation can be promoted by moving metal parts that cause reflections.

Particularly in the field of industrial automation, there are such sources of interference known that can contribute to massive fading of the signal.

In other fields as well, such as in the automobile industry, increasingly attempts are made to introduce wireless transmission in order to minimize the effort and expense of constructing wire harnesses and simultaneously save weight.

Here, too, essentially the same statements can be made as before for industrial automation.

Although first steps are being taken to make wireless communication useful in this field as well, the previous approaches have not been suited to the demands of real-time communication in terms of hard real-time communication.

This is based on the fact that, for one, the general ability to process fluctuations of the wireless channel does not necessarily mean that the previously used measures are also suitable for effectively counteracting fluctuations in the scope of (hard) real-time communication.

Highly developed error correction codes, for instance, cannot be used due to the highly limited transmission time, since these are very time-intensive both during encoding and decoding. Only with special, costly hardware would such an application be conceivable.

Moreover, transmission techniques that are based on instantaneous channel status information cannot be used, since no time is generally available for channel acquisition. There is generally no time for retransmission, either, since this retransmission requires active feedback on the part of the receiver via an incorrectly received message, and the retransmission required as a result must also occur within the given time.

SUMMARY

It is the object of the invention to provide a method and devices for this purpose, which solve one or more problems of the prior art in an innovative manner.

The object is achieved by a method and a device according to the independent claims. Additional arrangements according to the invention are the subject of the dependent claims. Moreover, the following detailed description delineates additional embodiments of the invention.

BRIEF DESCRIPTION OF THE DRAWINGS

The invention is explained in further detail below with reference to the figures.

DETAILED DESCRIPTION

The invention takes advantage of characteristics of new communications systems.

Accordingly, a multitude of communications systems use several carriers simultaneously in both wireless (WiMax, WLAN UMTS, LTE, DVB-T) and wired (DMT, DSL, Powerline) fields, which is to say different frequencies are used. This technology is referred to very generally as Frequency Division Multiplex (FDM).

One special embodiment of this technology is OFDM, for example.

These carriers form n sub-channels of different frequencies.

Other technologies use the parallel transmission in so-called Multiple-Input Systems (MIMO system or MISO system), that is, several spatially separated transmission paths from the transmitter to the receiver are used.

These transmission paths form n spatially different sub-channels.

Combinations of the two technologies can also be found in the wireless field (WiMax, LTE, IEEE 802.11 or IEEE 802.15).

Each of the technologies alone already enable the bandwidth to be increased substantially.

In the field of automation technology, as an example of a possible use in a real-time environment, the message sizes are generally small in comparison to the possible size of a typical IP packet to be transmitted, as an example of a data transmission.

In other words, the bandwidth does not represent a limiting factor in this context.

Since the message size to be expected in the field of real-time communication is rather small, the respective data D can be transmitted simultaneously and redundantly via a number of sub-channels in these communications systems without violating the applicable time criterion.

Figure 2:
FIG. 2 shows a variant on the transmission of data D.

Such a procedure is shown in FIG. 2, in which the data D are transmitted via 8 of 16 channels, with each of the boxes symbolically representing one sub-channel.

Figure 1:
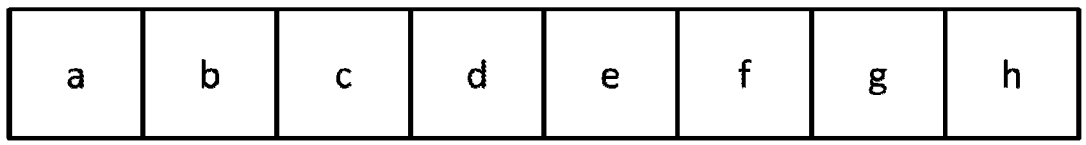
FIG. 1 shows schematically data D which are subdivided into fragments a . . . h.

The data D to be transmitted can also be subdivided, for example, into l=8 fragments a, b, c, d, e, f, g, h; see FIG. 1.

Figure 3:
FIG. 3 shows another variant on the transmission of data D.

Now these fragments a, b, c, d, e, f, g, h of the data D can each be transmitted individually via one of the n sub-channels, as shown in FIG. 3.

Although these fragments are shown as being of equal size, this is not necessary. For instance, it may be that the data D cannot be broken down into equally sized fragments. Then the last fragment can be filled, for example, with spaces, e.g., "0."

Of course, other quantities can also be used for the fragments.

In both of the cases shown in FIGS. 2 and 3, the data D could be transmitted.

In the case of FIG. 3, all of the messages would have to be received correctly. This could be achieved, for example, by a lower data rate. In this case, there is no redundancy.

In the case of FIG. 2, the data D are multiply redundant, which is to say that only one message needs to be received. In this form, a substantially higher data rate must be selected in comparison to FIG. 3 in order to still meet the time criterion.

The invention relates not only to a compromise between these two extremes, but rather also discloses that, with a certain redundancy according to the redundancy factor r, the probability of loss can be improved compared to both cases, which is to say that even an optimum redundancy can in principle be found.

Examples of such cases are shown in FIGS. 4 to 9.

For this purpose, the fragments a, b, c, d, e, f, g, h are now distributed to a quantity of sub-channels.

This distribution is done on the basis of statistically independent sub-channels.

The system receives hereto corresponding information, which m channels are statistically independent from each other. An estimate for statistical independence can be derived, for example, from a delay spread (rms).

The quantity of statistically independent channels m is greater than 1 and is generally less than the total number of sub-channels n, but can also be equal to it.

The distribution is furthermore based on information about the channel state of the n sub-channels. Substantially, the average signal/noise ratio (SNR) for the entire channel is of interest here.

This information can be reported back by the receiver during ongoing operation, but can also be detected by the transmitter itself upon receipt of acknowledgement messages via one or more of the sub-channels n.

This information can also be detected initially during the negotiation of connection parameters, i.e., when the connection is being established, and then monitored during operation.

Figure 4:
FIG. 4 shows a first distribution of fragments according to one embodiment of the invention.

In the example of FIG. 4, the fragments a, b, c, d, e, f, g, h are now distributed to m=8 of the n=16. These 8 sub-channels are statistically independent according to the information received.

In FIG. 4, 2 complete fragments are assigned to each of these m=8 statistically independent channels, such that each fragment is transmitted 2 times by means of all messages via the m sub-channels. In this respect, the degree of redundancy is r=2.

Figure 5:
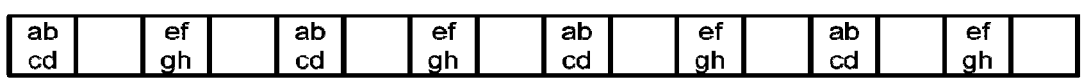
FIG. 5 shows a second distribution of fragments according to one embodiment of the invention.

In the example of FIG. 5, the fragments a, b, c, d, e, f, g, h are now distributed to m=8 of the n=16 sub-channels. These 8 sub-channels are statistically independent according to the information received.

In FIG. 4, each of these m=8 statistically independent channels is assigned 4 complete fragments, so that each fragment is transmitted 4 times by means of all messages via the m sub-channels. In this respect, the degree of redundancy is r=4.

It is self-explanatory that the quantity of statistically independent channels represents only an upper limit, and not every statistically independent channel need be used.

Figure 8:
FIG. 8 shows a possible entanglement of fragments according to one embodiment of the invention.

In addition, the distribution of the fragments as shown in FIG. 8 need not be such that the messages transported by means of the individual sub-channels are redundant, but rather, as shown in FIG. 8, the fragments can also be permuted and thus exhibit entanglement.

Figure 9:
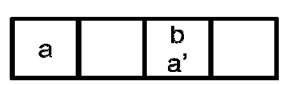
FIG. 9 shows a possible non-integer redundancy of a fragment according to one embodiment of the invention.

Although only complete fragments have been depicted as redundancy thus far, in principle it can be sufficient to have a partial redundancy. This case is shown in FIG. 9.

There, a portion of fragment a is appended to fragment b in a message via a second sub-channel. In this case, the redundancy is of course no longer an integer, but rather a real number.

In other words, the degree of redundancy r is determined on the basis of the number of statistically independent sub-channels m present and the size of the data D to be transmitted, as well as on the number of fragments.

This type of transmission mode can also be termed "Entangled Packet Repetition."

With an appropriate design, it is even conceivable to provide a Forward Error Correction (FEC), i.e., an encoding of the messages to be transmitted with redundancy, such that a receiver can rectify errors that occur. Noteworthy examples of such encoding would be Reed-Solomon, block codes or Hamming codes.

Figures 10, 11, 12:
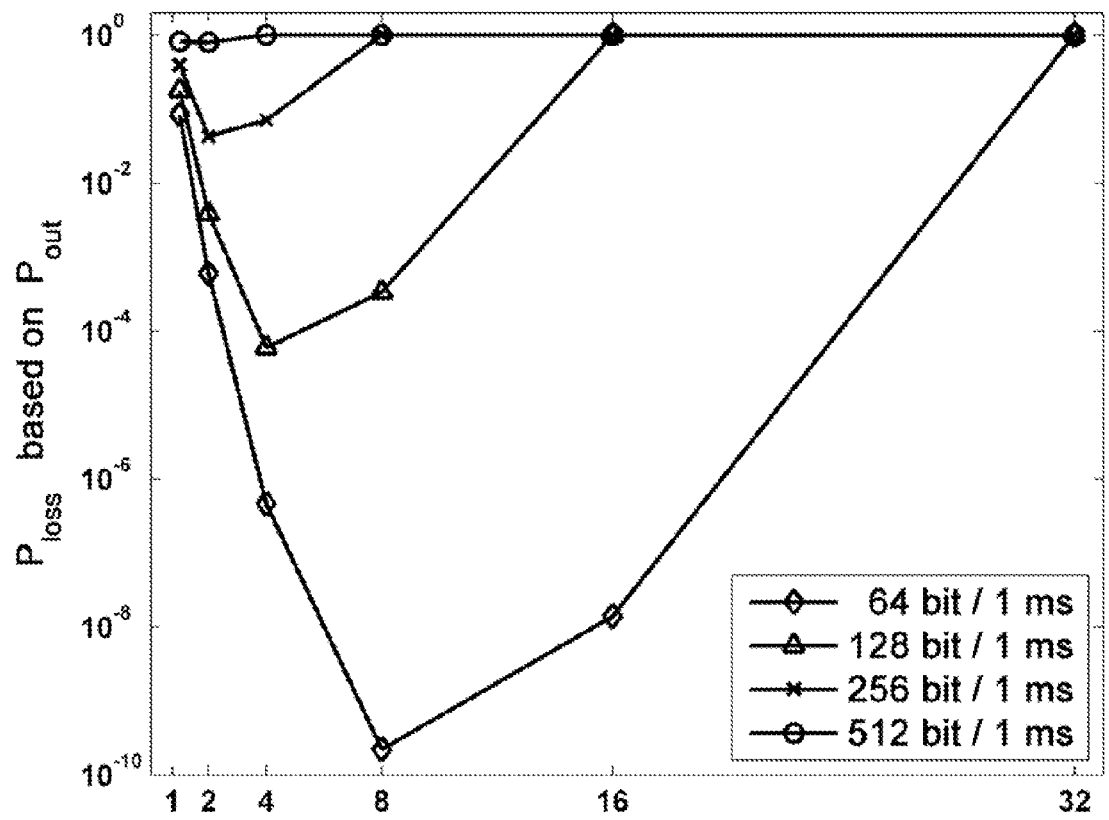
FIG. 10 shows a possible backup of a fragment according to one embodiment of the invention.
FIG. 11 shows another possible backup of fragments according to one embodiment of the invention.
FIG. 12 shows a numerically determined analysis of probabilities of failure for a plurality of redundancies with given delays and message sizes.

On the other hand, simpler backup measures can also be provided additionally or alternatively which constitute solely a backup in the backward direction. For instance, a checksum CRC can be provided which, as shown in FIG. 10, backs up individual fragments a, b or, as shown in FIG. 11, backs up several fragments a, b, together.

It is readily understood that these two types of checksum can also be used in combination.

Such a CRC can then be used by the receiver to discard faulty fragments and replace them with other fragments received error-free (redundant) and in the worst case request retransmission insofar as a time criterion still permits it.

Figure 6:
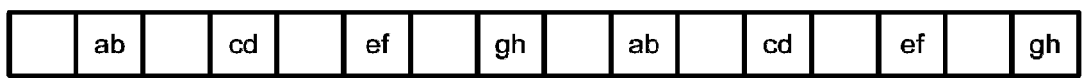
FIG. 6 shows a third distribution of fragments according to one embodiment of the invention.
Figure 7:
FIG. 7 shows a fourth distribution of fragments according to one embodiment of the invention.

Moreover, as shown in FIGS. 6 and 7 in contrast to FIGS. 4 and 5, a provision can also be made for the message to be retransmitted via an alternative sub-quantity of statistically independent sub-channels, insofar as a time criterion (maximum delay) still permits this.

By virtue of the invention, it is particularly made possible to transmit data D of small size, for example preferably of less than 1200 bytes, especially preferably of 100 bytes, with a probability of loss of less than $10^{-6}$.

Although the method according to the invention being presented is not limited to real-time communication, it is particularly in the field of hard real-time communication that its quality can be demonstrated.

In order to determine r, the maximum permissible delay of the data to be transmitted is also hereto considered. In doing so, the maximum permissible delay can be fixed or vary from moment to moment.

To calculate the redundancy factor r, a lookup table and/or a calculation can be used. To this end, the transmitter capabilities can be the deciding factor as to whether a calculation is possible or not within a predetermined time span.

In general, a re-determination of the redundancy factor will be necessary if the channel conditions (average signal/noise ratio SNR) has undergone substantial changes or if the number of statistically independent channels changes, or if the data size D varies greatly.

For instance, the transmitter can receive an acknowledgement from the receiver upon completed transmission of the messages which contains information about the channel state of the n sub-channels and/or the o selected sub-channels. This acknowledgement need not necessarily be transmitted via the same path, though, which is to say the same medium of communication, but rather it can also be sent via another medium of communication. Such methods are known, for example, from data transmission via satellite in which the backward channel is implemented via a modem line.

As already described above, any form of entanglement can be provided, even a Wei encoding of different sub-channels, for example.

In order for the receiver to also correctly decode the data, the receiver must receive data as to how the data are distributed. For this purpose, corresponding information can, for example, be built into a header of a message that indicates what type of degree of redundancy is being used.

The receiver can then recognize the fragments on the basis of this information and recompile the data D.

Alternatively, this information can also be exchanged via a separate control channel, for example before the data D are transmitted.

Although the invention has been portrayed substantially as a method up to this point, it will be clear to a person skilled in the art that this method can be logically used, for example, in a software-defined radio.

FIG. 12 shows the probability of loss $P_{loss}$ with respect to $P_{out}$, with the redundancy factor r being plotted on the ordinate.

Here, $$P_{loss} = 1 - (1 - (P_{channelerror})^r)^{\frac{m}{r}},$$

and $P_{channelerror}$ represents a probability of error within this channel. This probability of error generally depends on several parameters, for example on the quantity of data that is going over this channel.

Without wanting to go further into detail in this regard, it should be noted that there are also other possibilities for evaluating this formula, for example by applying other error models.

For instance, it is possible to use a model based on $P_{out}$ (outage capacity–probability of loss).

Moreover, it is also possible to use packet error probabilities or remainder error probabilities after encoding as the basis.

Only integer values of r are shown, assuming a maximum delay of 1 ms for all messages and assuming the message size for the individual messages on the statistically independent channels (here 32 of 512) to be either 64 bits, 128 bits, 256 or 512 bits.

The following table shows additional parameters that were used as the basis for the calculation.

| Symbol | Explanation | Value |
|---|---|---|
| W | available bandwidth | 3.2 MHz |
| n | quantity of possible sub-channels | 512 |
| B | total bandwidth used | 200 kHz |
| m | quantity of sub-channels used | 32 |
| M | square-QAM type used | {2, 4, 16, 256} |
| γ | average SNR | {10, 20, 30} dB |
|  | delay spread (rms) | ≈1.6 μs |
| $I_{out}$ | message size | {64, 128, 256, 512} bit |
| $D_{out}$ | maximum permissible delay | 1 ms |
| r | redundancy | {1, 2, 4, 8, 16, 32} |

The case corresponding to FIG. 3 is shown at the far right, whereas the case corresponding to FIG. 2 for the respective curve is shown to the far left.

It follows readily from FIG. 12 that the entangled packet transmission approach offers substantial advantages.

In this way, probabilities of loss of $10^{-10}$ can be achieved with the given boundary parameters for message sizes of 64 bits on the individual sub-channels with a redundancy factor of 8.

Since the calculation of r is generally not simple, this value can be determined numerically.

In doing so, one can take advantage of the characteristic that the curves each have a minimum, such that the increase of the probability of loss can be used as a stop criterion. One can begin with for example r=1 and increase r each time, for example by increment or bit shift.

The results can also be logged in a lookup table for certain quantities of independent channels and certain SNR values.

The invention claimed is:

1. Method for a transmitter for a multi-channel communication system for transmitting real-time-sensitive data D,
   wherein the communication system comprises n sub-channels,
   wherein n is greater than 1,
   wherein the sub-channels are spatially distinct and/or the sub-channels comprise a distinct frequency,
   comprising the steps:
   receiving of information about the channel state of the n sub-channels,
   receiving of information on the quantity of statistically independent sub-channels m, with m being less than or equal to n,
   receiving of data D intended for transmission,
   distribution of the data D intended for transmission into l fragments,
   provision of a plurality o of messages for transmission to at least one receiver, wherein the quantity of messages o is less than or equal to the quantity of statistically independent sub-channels m,
   wherein each of the messages comprises at least one fragment,
   wherein one of the messages further comprises at least a portion of a fragment,
   wherein at least one fragment in the plurality o of messages is contained at least r times in different messages as a fragment and/or at least as the portion of the fragment, with r being greater than 1,
   wherein r is determined on the basis of the number of statistically independent sub-channels m present and the size of the data to be transmitted
   transmission of the plurality o of messages, wherein each message is transmitted by means of another of the o channels.

2. Method as set forth in claim 1, wherein the multi-channel communication system is an OFDM-based multiple-carrier communication system.

3. Method as set forth in claim 1, wherein the multi-channel communication system is a MIMO system or a MISO system.

4. Method as set forth in claim 1, wherein the multi-channel communication system is an LTE-System or a WiMax system or a WLAN system, particularly an IEEE 802.11- or IEEE 802.15-compliant system.

5. Method as set forth in claim 1, wherein the probability of loss is less than $10^{-6}$ for messages up to a size of preferably 100 bytes.

6. Method as set forth in claim 1, wherein the method for determining r comprises the receiving of information by means of a maximum permissible delay of the data to be transmitted.

7. Method as set forth in claim 1, wherein the method for determining r comprises the evaluation of a lookup table and/or the calculation of one of r.

8. Method as set forth in claim 1, wherein the multi-channel communication system, upon completed transmission of the messages, receives information about the channel state of the n sub-channels and/or the o selected sub-channels.

9. Method as set forth in claim 1, wherein the individual messages comprise an error control with respect to the message and/or individual fragments in a message and/or wherein individual messages are entangled.

10. Method as set forth in claim 1, wherein, before or during the transmission of the data D intended for transmission, information on the distribution of the data D intended for transmission is forwarded to the receiver.

* * * * *